United States Patent
Zanini et al.

(10) Patent No.: US 7,789,507 B2
(45) Date of Patent: Sep. 7, 2010

(54) FACILITATING RELEASE OF SILICONE HYDROGEL OPHTHALMIC LENSES

(75) Inventors: Diana Zanini, Jacksonville, FL (US); Douglas G. Vanderlaan, Jacksonville, FL (US); James D. Ford, Orange Park, FL (US); Vincent H. Barre, Jacksonville, FL (US); Rachel E. Hauser, Jacksonville, FL (US)

(73) Assignee: Johnson & Johnson Vision Care, Inc., Jacksonville, FL (US)

(*) Notice: Subject to any disclaimer, the term of this patent is extended or adjusted under 35 U.S.C. 154(b) by 412 days.

(21) Appl. No.: 11/672,200

(22) Filed: Feb. 7, 2007
(Under 37 CFR 1.47)

(65) Prior Publication Data
US 2007/0242219 A1   Oct. 18, 2007

Related U.S. Application Data

(60) Provisional application No. 60/771,313, filed on Feb. 8, 2006.

(51) Int. Cl.
*G02C 7/04* (2006.01)
*A61F 2/16* (2006.01)

(52) U.S. Cl. .............. 351/160 H; 351/177; 623/6.56
(58) Field of Classification Search .......... 351/160 H; 623/6.56; 530/421
See application file for complete search history.

(56) References Cited

U.S. PATENT DOCUMENTS

| | | | |
|---|---|---|---|
| 4,197,266 A | 4/1980 | Clark et al. | |
| 5,258,490 A | 11/1993 | Chang | |
| 6,207,086 B1 | 3/2001 | Schlagel et al. | |
| 6,500,481 B1 * | 12/2002 | Vanderlaan et al. | 427/2.24 |
| 7,249,848 B2 * | 7/2007 | Laredo et al. | 351/160 H |
| 2002/0006890 A1 * | 1/2002 | Sunder et al. | 510/446 |
| 2003/0162862 A1 * | 8/2003 | McCabe et al. | 523/106 |
| 2007/0188703 A1 * | 8/2007 | Vanderlaan et al. | 351/177 |
| 2008/0316424 A1 * | 12/2008 | McCabe et al. | 351/162 |

FOREIGN PATENT DOCUMENTS

| | | | |
|---|---|---|---|
| WO | WO 0170490 A2 | 3/2001 | |
| WO | WO 03022321 A3 | 3/2003 | |

* cited by examiner

*Primary Examiner*—Jordan M. Schwartz
(74) *Attorney, Agent, or Firm*—Joseph P Kincart

(57) ABSTRACT

This invention includes methods and systems for processing hydrogel biomedical devices, such as ophthalmic lenses using polyethylene glycol to facilitate release of the devices from a mold part.

8 Claims, 3 Drawing Sheets

FACILITATING RELEASE OF SILICONE HYDROGEL OPHTHALMIC LENSES

RELATED APPLICATION INFORMATION

This patent application claims priority of a provisional application, U.S. Ser. No. 60/771,313, which was filed on Feb. 8, 2006, the entire disclosure of which is hereby incorporated by reference.

FIELD OF THE INVENTION

This invention relates to a process to produce ophthalmic lenses made from silicone hydrogels. More specifically, the present invention relates to methods and systems for releasing an ophthalmic lenses from mold parts in which they were formed by exposure of the lenses to a release aid which includes a surfactant.

BACKGROUND OF THE INVENTION

It is well known that contact lenses can be used to improve vision. Various contact lenses have been commercially produced for many years. Early designs of contact lenses were fashioned from hard materials. Although these lenses are still currently used in some applications, they are not suitable for all patients due to their poor comfort and relatively low permeability to oxygen. Later developments in the field gave rise to soft contact lenses, based upon hydrogels.

Hydrogel contact lenses are very popular today. These lenses are often more comfortable to wear than contact lenses made of hard materials. Malleable soft contact lenses can be manufactured by forming a lens in a multi-part mold where the combined parts form a topography consistent with the desired final lens.

Multi-part molds used to fashion hydrogels into a useful article, such as an ophthalmic lens, can include for example, a first mold portion with a convex surface that corresponds with a back curve of an ophthalmic lens and a second mold portion with a concave surface that corresponds with a front curve of the ophthalmic lens. To prepare a lens using such mold portions, an uncured hydrogel lens formulation is placed between the concave and convex surfaces of the mold portions and subsequently cured. The hydrogel lens formulation may be cured, for example by exposure to either, or both, heat and light. The cured hydrogel forms a lens according to the dimensions of the mold portions.

Following cure, traditional practice dictates that the mold portions are separated and the lens remains adhered to one of the mold portions. A release process detaches the lens from the remaining mold part. According to prior art, release of the lens from the mold can be facilitated by exposure of the lens to aqueous or saline solutions which act to swell the lens and loosen adhesion of the lens to the mold.

New developments in the field have led to contact lenses that are made from silicone hydrogels. Known hydration processes using aqueous solutions to effect release have not been efficient with silicone hydrogel lenses. Consequently, attempts have been made to release silicone lenses using organic solvents. Processes have been described in which a lens is immersed in an alcohol (ROH), ketone (RCOR'), aldehyde (RCHO), ester (RCOOR'), amide (RCONR'R") or N-alkyl pyrrolidone for 20 hours-40 hours and in the absence of water, or in an admixture with water as a minor component (see e.g., U.S. Pat. No. 5,258,490).

However, although some success has been realized with the known processes, the use of highly concentrated organic solutions can present drawbacks, including, for example: safety hazards; increased risk of down time to a manufacturing line; high cost of release solution; and the possibility of collateral damage, due to explosion.

Therefore, it would be advantageous to find a method of producing a silicone hydrogel contact lens which requires the use of little or no organic solvent, avoids the use of flammable agents, that effectively releases lenses from the molds in which they were formed, and which removes UCDs from the lens.

SUMMARY OF THE INVENTION

Accordingly, the present invention provides apparatus and methods for facilitating the release of a silicone hydrogel ophthalmic lens from mold part. According to the present invention a polyether is utilized to aid the release of the lens from the mold part. In some embodiments, the polyether can be included in a monomer used to form the lens. Some embodiments can include a polyether included in a mold part material and still additional embodiments can include the polyether in a solution to which a formed lens is exposed.

In addition, the present invention relates generally to ophthalmic lenses fashioned from materials including wettable silicone hydrogels formed from a reaction mixture including at least one high molecular weight hydrophilic polymer and at least one hydroxyl-functionalized silicone-containing monomer. In some embodiments, the ophthalmic lenses are formed from a reaction mixture including a high molecular weight hydrophilic polymer and an effective amount of a hydroxyl-functionalized silicone-containing monomer.

In other embodiments, the present invention relates to a method of preparing a biomedical device, such as an ophthalmic lens which includes including an effective amount of polyether, such as, for example: PEG or PEO, into a polymer, such as a high molecular weight hydrophilic polymer, and curing the mixture to create a biomedical device, such as an ophthalmic lens. Embodiments can therefore include any method of incorporating the PEG or PEO into the hydrophilic monomer, including for example: mixing the PEG or PEO into a monomer used to form the polymer, including the PEG or PEO into a mold plastic used to form the biomedical device and including the PEG or PEO in a hydration solution to which the formed biomedical device is exposed subsequent to polymerization.

In some embodiments, the present invention still further relates to an ophthalmic lens formed from a reaction mixture including at least one hydroxyl-functionalized silicone-containing monomer and an amount of high molecular weight hydrophilic polymer sufficient to incorporate into the lens, without a surface treatment, an advancing contact angle of less than about 80.degree.

DETAILED DESCRIPTION OF THE INVENTION

Figure 1:
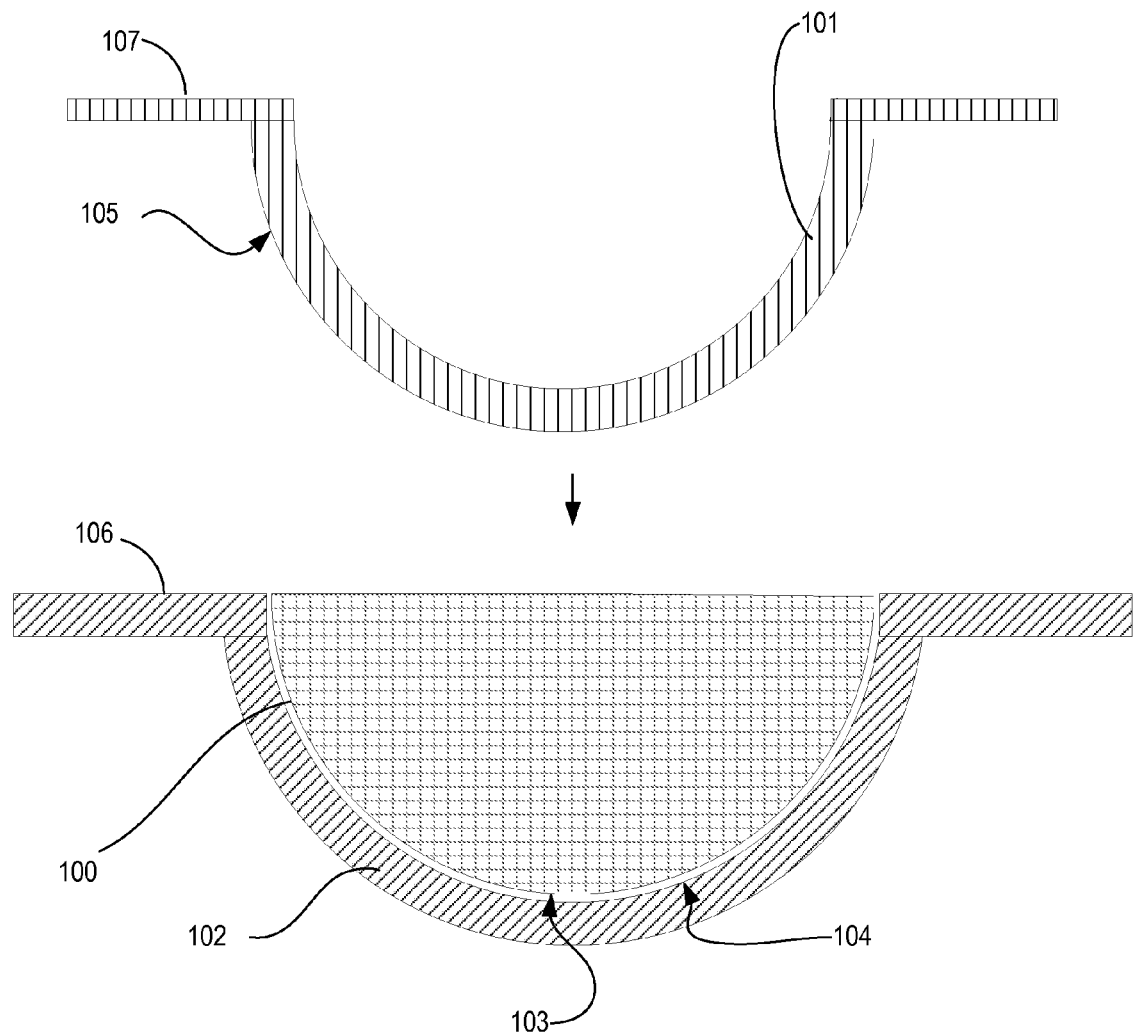
FIG. 1 illustrates a diagram of an ophthalmic lens mold and lens.

The present invention relates to release of a silicone hydrogel lens from a mold part used to form the lens. It has been found that release of a silicone hydrogel ophthalmic lens can be facilitated by exposing a monomer used to form the lens, or the polymerized lens, to a polyether, such as PEG or PEO. According to the present invention, the polyether can facilitate release if it is mixed with a monomer prior to polymerization, if it is included in the plastic of a mold part used to form the lens, and if it is included in an aqueous solution to which a formed lens is exposed.

PEG and PEO materials are soluble in water and in many organic solvents and in various embodiments of the present invention, can be incorporated into one or more of: a monomer mix, a mold part and a solution used to treat the formed lens.

Generally, Polyethylene glycol (PEG) and polyethylene oxide (PEO) are polymers that are generally the same in structure except for chain length and end groups. Polyethylene glycol refers to the polymer with molecular weight less than 50,000 (a condensation polymer made from ethylene glycol), while polyethylene oxide is used for higher molecular weights (an addition polymer). PEG and PEO have different physical properties (i.e. viscosity) due to chain length effects, however, their chemical properties are nearly identical. Specific examples of PEG and PEO, such as PEG methyl ether 2000 and PEG 2000 can be particularly effective. Other variations included in the present invention include mPEG and PEG DME.

The chemical structure of polymeric polyethylene glycol is generally as follows:

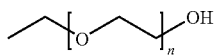

and; polyethylene glycol has the following structure:

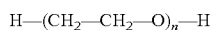

According to the present invention, PEG and PEO can couple to hydrophobic molecules to produce non-ionic surfactants which facilitate the release of an ophthalmic lens or other biomedical device from a mold part utilized to fashioned them. Generally, as used herein, surfactants are water-soluble surface-active agents comprised of a hydrophobic portion, usually a long alkyl chain, attached to hydrophilic or water solubility enhancing functional groups. In the present invention, nonionic hydrophiles associate with water at the ether oxygens of a polyethylene glycol chain. The hydrophilic end of the surfactant is strongly attracted to the water molecules and the force of attraction between the hydrophobe and water is only slight. As a result, the surfactant molecules align themselves at the surface and internally so that the hydrophile end is toward the water and the hydrophobe is squeezed away from the water.

Ophthalmic lens manufacturing processing typically includes the step of releasing the lens from the front curve mold during hydration. Release allows the lens to be further processed and placed into a primary package for further processing, such as inspection and sterilization. In the present invention, surfactants of the PEG family of molecules have been found to have a beneficial impact on lens release without adversely impacting lens quality.

In particular, the present invention teaches that polyethylene glycol dimethyl ether 2000 and poly(ethylene glycol) 2000 are useful in facilitating release of an ophthalmic lens from a mold part used to form the lens.

DEFINITIONS

As used herein, "high molecular weight hydrophilic polymer" refers to substances having a weight average molecular weight of no less than about 100,000 Daltons, wherein said substances upon incorporation to silicone hydrogel formulations, increase the wettability of the cured silicone hydrogels.

As used herein the term "monomer" is a compound containing at least one polymerizable group and an average molecular weight of about less than 2000 Daltons, as measured via gel permeation chromatography refractive index detection. Thus, monomers can include dimers and in some cases oligomers, including oligomers made from more than one monomeric unit.

As used herein, the terms "lens", "ophthalmic lens" and "ophthalmic device" refer to devices that reside in or on the eye. These devices can provide optical correction, wound care, drug delivery, diagnostic functionality, cosmetic enhancement or effect or a combination of these properties. The term lens includes but is not limited to soft contact lenses, hard contact lenses, intraocular lenses, overlay lenses, ocular inserts, and optical inserts.

As used herein, the term PEG refers to a polyethylene glycol.

As used herein, the term PEO refers to a polyethylene oxide.

As used herein, "released from a mold," means that a lens is either completely separated from the mold, or is only loosely attached so that it can be removed with mild agitation or pushed off with a swab.

Lens Formation

Referring now to FIG. 1, a block diagram is illustrated of an ophthalmic lens 100, such as a contact lens, and mold parts 101-102 used to form the ophthalmic lens 100 (prior art). In some typical embodiments, the mold parts include a back surface mold part 101 and a front surface mold part 102. As used herein, the term "front surface mold part" refers to the mold part whose concave surface 104 is a lens forming surface used to form the front surface of the ophthalmic lens. Similarly, the term "back surface mold part" refers to the mold part 101 whose convex surface 105 forms a lens forming surface, which will form the back surface of the ophthalmic lens 100. In some embodiments, mold parts 101 and 102 are of a concavo-convex shape, preferably including planar annular flanges 106 and 107, respectively, which surround the circumference of the uppermost edges of the concavo-convex regions of the mold parts 101-102.

Typically, the mold parts 101-102 are arrayed as a "sandwich". The front surface mold part 102 is on the bottom, with the concave surface 104 of the mold part facing upwards. The back surface mold part 101 can be disposed symmetrically on top of the front surface mold part 102, with the convex surface 105 of the back surface mold part 101 projecting partially into the concave region of the front surface mold part 102. Preferably, the back surface mold part 101 is dimensioned such that the convex surface 105 thereof engages the outer edge of the concave surface 104 of the front mold part 102 throughout its circumference, thereby cooperating to form a sealed mold cavity in which the ophthalmic lens 100 is formed.

In some embodiments, the mold parts 101-102 are fashioned of thermoplastic and are transparent to polymerization-initiating actinic radiation, by which is meant that at least some, and preferably all, radiation of an intensity and wavelength effective to initiate polymerization of the Reaction Mixture or monomer ("Reaction Mixture") in the mold cavity can pass through the mold parts 101-102.

For example, mold parts can include: polystyrene; polyvinylchloride; polyolefin, such as polyethylene and polypropylene; copolymers or mixtures of styrene with acrylonitrile or butadiene, polyacrylonitrile, polyamides, polyesters, cyclic olefin copolymers, or other known material.

According to the present invention, one or more of the mold parts 101-102 include at least one of: PEG and PEO in an amount effective to facilitate release of the lens from the one or more lens part 101-102. An effective amount of the at least one of PEG and PEO, according to the present invention, is an amount that will coincide with a shorter release time with inclusion of the at least one of PEG and PEO with an equivalent Reaction Mixture and conditions, as compared to a mold part without the at least one of PEG and PEO. According to some embodiments of the present invention, one or more of PEG and PEO, such as for example, PEG 2000 can be added to the mold material as an additive prior to an injection molding process used to fashion the mold part.

In some preferred embodiments, the one or more of PEG and PEO, such as, for example PEG 2000, is added to the mold plastic in amounts of between 25 parts per million (ppm) to 1000 parts per million, in some more preferable embodiments, the one or more of PEG and PEO is added in amounts of between 50 ppm to 200 ppm.

Method Steps

Following polymerization of the Reaction Mixture to form a lens 100, the lens surface 103 will typically adhere to the mold part surface 104. The steps of the present invention facilitate release of the surface 103 from the mold part surface.

Figure 2:
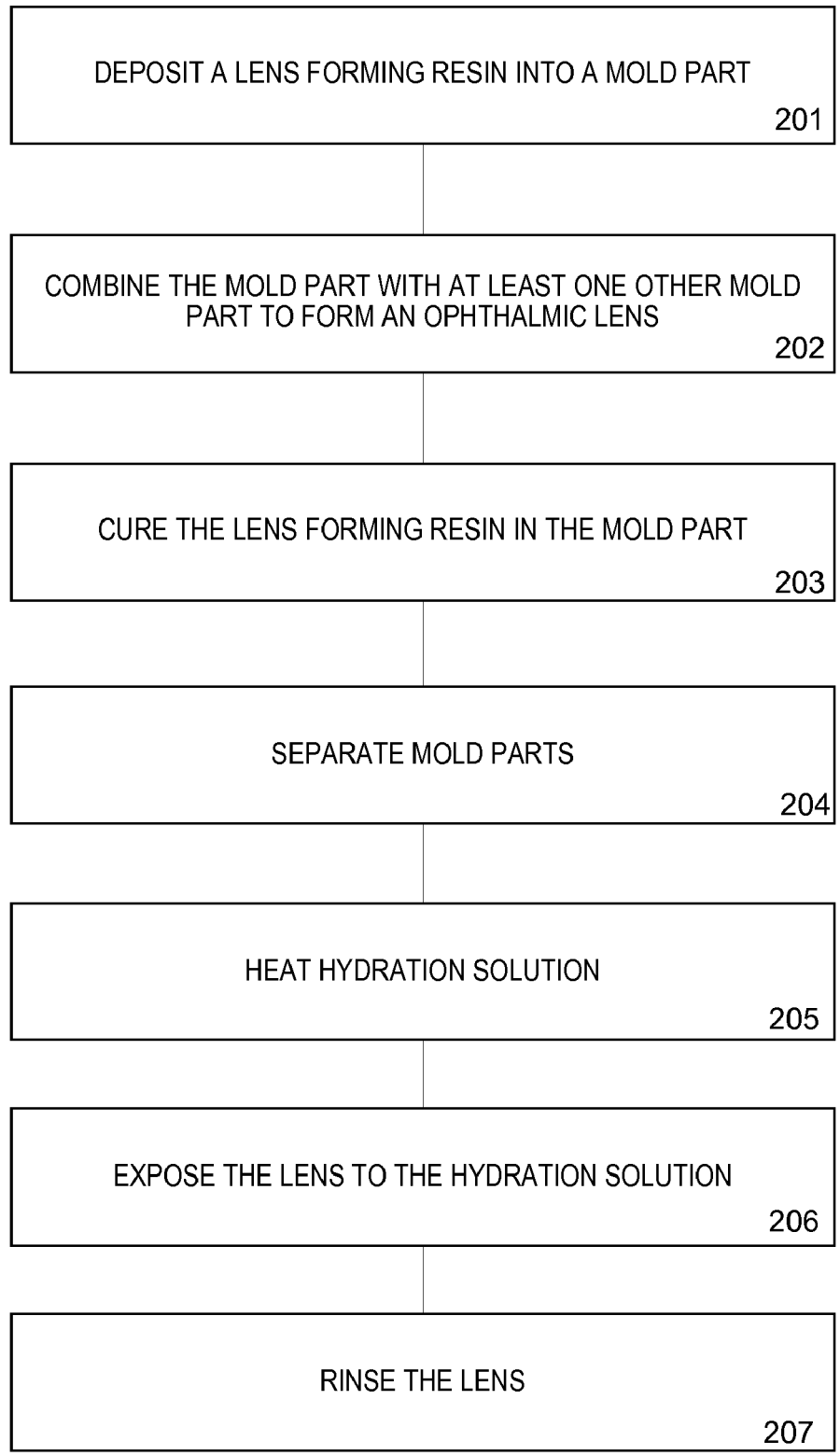
FIG. 2 illustrates a block diagram of exemplary steps that can be utilized to implement some embodiments of the present invention.

Referring now to FIG. 2, a flow diagram illustrates exemplary steps that may be implemented in some embodiments of the present invention. It is to be understood that some or all of the following steps may be implemented in various embodiments of the present invention. At 201, the Reaction Mixture (described in more detail below), is deposited into a first mold part 102, which is utilized to shape the ophthalmic lens 100.

At 202, the first mold part 102 can be combined with at least one other mold part (the second mold part) 101 to shape the deposited silicone monomer or other Reaction Mixture.

At 203, the Reaction Mixture is cured and formed into a lens 100. Curing can be effected, for example, by various means known in the art, such as, exposure of the monomer to actinic radiation, exposure of the monomer to elevated heat (i.e. 40° C. to 75° C.), or exposure to both actinic radiation and elevated heat.

At 204, the first mold part 101 can be separated from the second mold part 102 in a demolding process. In some embodiments, the lens 100 will have adhered to the second mold part 102 (i.e. the front curve mold part) during the cure process and remain with the second mold part 102 after separation until the lens 100 has been released from the front curve mold part 102. In other embodiments, the lens 100 can adhere to the first mold part 101.

At 205, in some embodiments, the hydration solution can be heated. For example, the hydration solution may be raised to a temperature of between about 40° C. to about 72° C. Heating can be accomplished with a heat exchange unit to minimize the possibility of explosion, or by any other feasible means or apparatus for heating a liquid.

At 206, the lens is hydrated by exposing the lens to the hydration solution. According to the present invention, the hydration solution is an aqueous solution which includes one or more of PEG and PEO, and in some particular embodiments PEG 2000, in an amount effective to facilitate release of the lens 100 from the mold part 102.

According to the present invention, an amount of PEG and PEO in the hydration solution which is effective to facilitate release of the lens from the one or more lens part 101-102 is an amount that will coincide with a shorter release time with inclusion of the at least one of: PEG and PEO (with an equivalent Reaction Mixture and under equivalent conditions), as compared to a hydration solution without the at least one of: PEG and PEO.

In some embodiments, the hydration solution may also include additives, such as Tween 80, which is polyoxyethylene sorbitan monooleate, Tyloxapol, octylphenoxy (oxyethylene) ethanol, amphoteric 10), preservatives (e.g. EDTA, sorbic acid, DYMED, chlorhexadine gluconate, hydrogen peroxide, thimerosal, polyquad, polyhexamethylene biguanide, antibacterial agents, lubricants, salts and buffers. In some embodiments, additives can be added to the hydration solution in amounts varying between 0.01% and 10% by weight, but cumulatively less than about 10% by weight.

The temperatures of the hydration solution can be anywhere from near freezing to near boiling; however, it is preferred that the temperatures between 30° C. and 72° C., and even more preferably between 45° C. and 65° C.

Exposure of the ophthalmic lens 100 to the hydration solution can be accomplished by washing, spraying, soaking, submerging, or any combination of the aforementioned. For example, in some embodiments, the lens 100 can be washed with a hydration solution of deionized water and PEG 2000 in a hydration tower.

To hydrate the lenses by washing in a hydration tower, front curve mold parts 102 containing lenses 100 can be placed in pallets or trays and stacked vertically. The solution can be introduced at the top of the stack of lenses 100 so that the solution will flow downwardly over the lenses 100. The solution can also be introduced at various positions along the tower. In some embodiments, the trays can be moved upwardly allowing the lenses 100 to be exposed to increasingly fresher solution.

In other embodiments, the ophthalmic lenses 100 are soaked or submerged in hydration solution during the hydration step 206.

The hydration step can last from between 2 minutes to 400 minutes, preferably between from 10 minutes and 180 minutes, more preferably from 15 to 30 minutes; however, the length of the hydration step depends upon the lens materials, including colorant materials if any, the materials that are used for the solutions or solvents, and the temperatures of the solutions. Hydration treatment time can be different from the time required for the lens and the solution to reach equilibrium. Sufficient treatment times typically swell the contact lens, release the lens from the mold part and bring the lens to a functional size.

In some preferred methods, after separation or demolding, the lenses on the front curves, which may be part of a frame, are mated with individual concave slotted cups to receive the contact lenses when they release from the front curves. The cups can be part of a tray. Examples can include trays with 32 lenses each, and 20 trays that can be accumulated into a magazine.

According to some embodiments of the present invention that expose the lenses to the hydration solution via submersion, magazines can be accumulated and then lowered into tanks containing the hydration solution that includes at least one of PEG and PEO, and preferably PEG 2000. The solution may also include other additives as described above. In addition, in some embodiments, the hydration solution can be heated to a temperature of between about 30° C. and 72° C.

At 207, the ophthalmic lenses are rinsed to remove the PEG 2000 and any residue from the lenses. Rinsing can be accomplished, for example, by any method that exposes the lens to a rinsing solution, such as, for example, DI water. Accordingly, in various embodiments rinsing can include one or more of: subjecting the lens to a flow of rinsing solution, and submersion of the lens in a rinsing solution.

In some embodiments, one or more of the mold parts into which the Reaction Mixture is placed includes one or more of: PEG and PEO in the mold part material. Typically, an ophthalmic lens is fashioned with a first mold part with a convex surface that corresponds with a back curve of an ophthalmic lens and a second mold part with a concave surface that corresponds with a front curve of the lens.

According to the present invention, one or more of the: PEG and PEO which make up one or more of the concave and convex mold parts, aids in release of the of the lens from the mold part to which the lens has remained adhered to after separation.

In some embodiments, in which the one or more of PEG and PEO is included in both mold parts, the PEG and PEO can also facilitate separation of the mold parts without damage to the cured lens contained between the mold parts. According to the present invention, the one or more of: PEG and PEO may assimilate into the Reaction Mixture from the mold parts.

Apparatus

Figure 3:
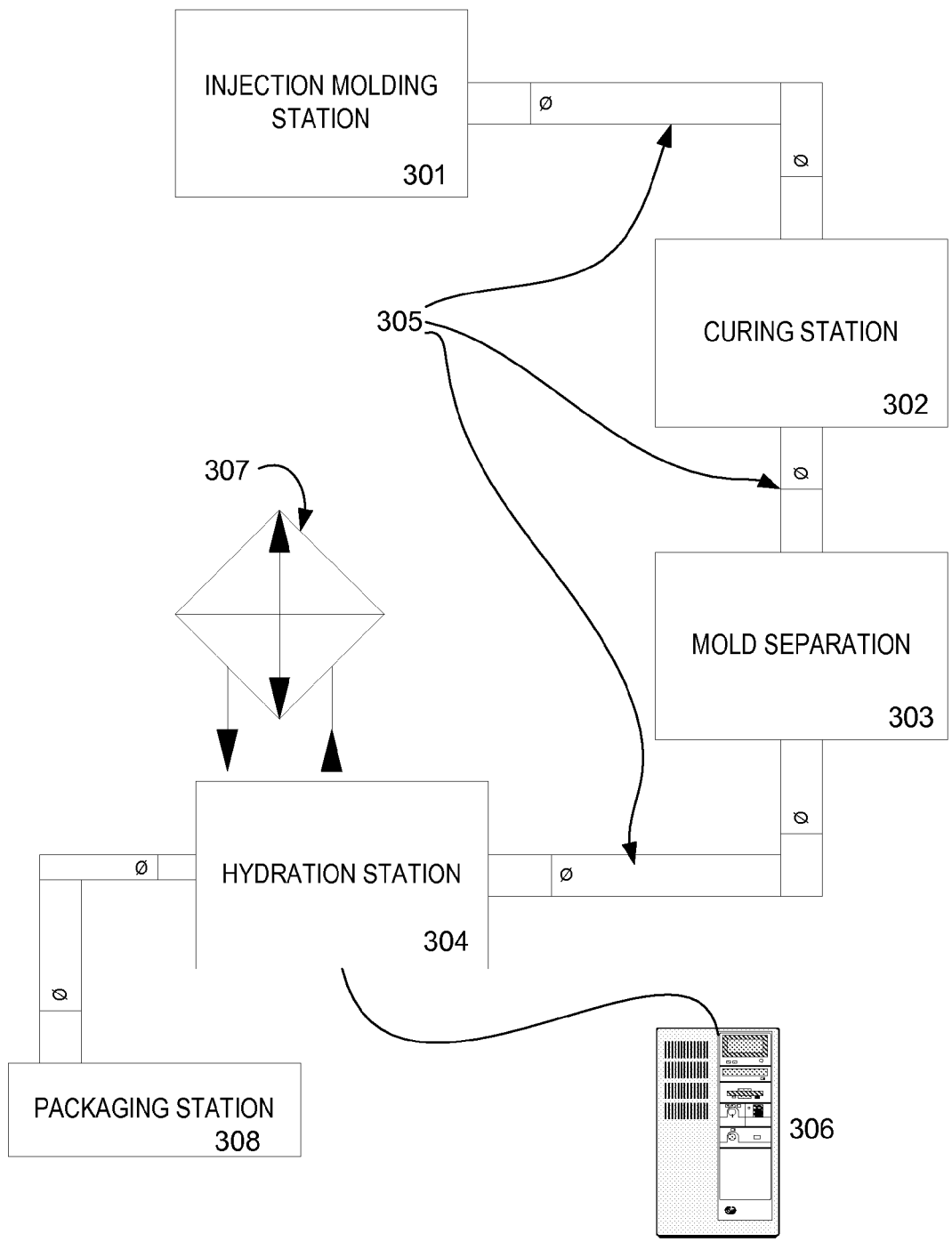
FIG. 3 illustrates a diagram of apparatus that can be utilized to implement some embodiments of the present invention.

Referring now to FIG. 3, a block diagram is illustrated of apparatus contained in processing stations 301-304 that can be utilized in implementations of the present invention. In some preferred embodiments, processing stations 301-304 can be accessible to ophthalmic lenses 100 via a transport mechanism 305. The transport mechanism 305 can include for example one or more of: a robot, a conveyor and a rail system in conjunction with a locomotion means that may include, a conveyor belt, chain, cable or hydraulic mechanism powered by a variable speed motor or other known drive mechanism (not shown).

Some embodiments can include back surface mold parts 101 placed in pallets (not shown). The pallets can be moved by the transport mechanism 305 between two or more processing stations 301-304. A computer or other controller 306 can be operatively connected to the processing stations 301-304 to monitor and control processes at each station 301-304 and also monitor and control the transport mechanism 305 to coordinate the movement of lenses between the process stations 301-304.

Processing stations 301-304 can include, for example, an injection molding station 301. At the injection molding station 301, injection molding apparatus deposits a quantity of a Reaction Mixture, such as, for example, a silicone hydrogel as described above, into the front curve mold portion 102 and preferably completely covers the mold surface 104 with the Reaction Mixture. The Reaction Mixture should comprise any material or mixture of materials, which upon polymerization yields an optically clear, integral shape-sustaining contact lens or contact lens precursor.

As utilized in this application, a "precursor" means an object which has the desired relative dimensions and which upon subsequent hydration in water or buffered isotonic saline aqueous solution can be worn as a contact lens. Examples of such compositions abound in this field and are readily ascertainable by reference to standard literature sources.

In some embodiments, polymerization of Reaction Mixture can be carried out in an atmosphere with controlled exposure to oxygen, including, in some embodiments, an oxygen-free environment, because oxygen can enter into side reactions which may affect a desired optical quality, as well as the clarity of the polymerized lens. In some embodiments, the lens mold halves are also prepared in an atmosphere that has limited oxygen or is oxygen-free. Methods and apparatus for controlling exposure to oxygen are well known in the art.

A curing station 302 can include apparatus for polymerizing the Reaction Mixture. Polymerization is preferably carried out by exposing the Reaction Mixture, including the PEG 2000 or other PEG or PEO to polymerization initiating conditions. Curing station 302 therefore includes apparatus that provide a source of initiation of the Reaction Mixture deposited into the front curve mold 102. The source of initiation can include for example, one or more of: actinic radiation and heat. In some embodiments, actinic radiation can be sourced from bulbs under which the mold assemblies travel. The bulbs can provide an intensity of actinic radiation in a given plane parallel to the axis of the bulb that is sufficient to initiate polymerization.

In some embodiments, a curing station 302 heat source can be effective to raise the temperature of the Reactive Mixture to a temperature sufficient to assist the propagation of the polymerization and to counteract the tendency of the Reaction Mixture to shrink during the period that it is exposed to the actinic radiation and thereby promote improved polymerization. Some embodiments can therefore include a heat source that can maintain the temperature of the Reaction Mixture (by which is meant that resin before it begins to polymerize, and as it is polymerizing) above the glass transition temperature of the polymerized product or above its softening temperature as it is polymerizing. Such temperature can vary with the identity and amount of the components in the Reaction Mixture. In general, some embodiments include apparatus capable of establishing and maintaining temperatures on the order of 40° C. degree to 75° C.

In some embodiments, a source of heat can include a duct, which blows warm gas, such as, for example, $N_2$ or air, across and around the mold assembly as it passes under the actinic radiation bulbs. The end of the duct can be fitted with a plurality of holes through which warm gas passes. Distributing the gas in this way helps achieve uniformity of temperature throughout the area under the housing. Uniform temperatures throughout the regions around the mold assemblies can facilitate more uniform polymerization.

A mold separation station 303 can include apparatus to separate the back curve mold part 101 from the front curve mold part 102. Separation can be accomplished for example with mechanical fingers and high speed robotic movement that pry the mold parts apart.

In some embodiments, a cured lens which includes a polymer/diluent mixture can be treated by exposure to a hydration solution at a hydration station 304 which removes the diluent and ultimately replaces the diluent with water, whereby a silicone hydrogel lens is formed having a final size and shape which are quite similar to the size and shape of the original molded polymer/diluent article.

In some embodiments, the hydration solution utilized to remove the diluent can also be used to facilitate release of the lens from a mold part in which the lens was formed, for example, the back curve mold part. According to the present invention, the hydration solution used for treating the lens includes one or more of: PEG and PEO, and in some preferred embodiments, the solution will include PEG 2000. Some preferred embodiments can include a solution which includes deionized water (DI water) and 500 parts per million (ppm) to 2000 ppm of PEG 2000, and some more preferred embodiments including 800 ppm to 1200 ppm PEG 2000.

The hydration station 304 can include, for example, a hydration tower or a submersion vehicle capable of exposing the ophthalmic lenses 100 to a hydration process in accordance with the present invention. For example, hydration station 304 can include an apparatus in which the lenses are stacked vertically in trays, which are moved upwardly, and a flow of the hydration solution flows downwardly in the tray stack to successively wash the lenses in the lower trays of the stack. The solution may be introduced at the top of the stack or fresh solution may be introduced at various points in the stack. In some embodiments, a flow of hydration solution with different concentrations of one or more of PEG and PEO may be introduced at various points in the stack. Generally, a cascade of solution flows downwardly over each ophthalmic lens. Detailed descriptions of various embodiments of hydration apparatus utilizing a downward flow are disclosed in U.S. Pat. No. 6,207,086, which is incorporated by reference into this application.

Some embodiments can also include submersion of the ophthalmic lenses into a hydration tank. For example, front curve mold parts 102 containing lenses 100 can be sandwiched between a mold carrier and a plate to form a hydration carrier (not shown). Robotic assemblies can immerse each hydration carrier in the hydration solution. Detailed descriptions and examples of various embodiments of hydration apparatus utilizing a downward flow are disclosed in U.S. Pat. No. 6,207,086, which is incorporated herein by reference.

Various embodiments can include a series of multiple solution baths into which the lenses are placed or various flows of hydration solution to which the lenses are exposed. Each bath or flow may have the same or a different concentration of one or more of: PEG and PEO in DI.

For example, some embodiments may include lenses that are exposed (i.e. through submersion or solution flow) to a hydration solution with a primary purpose of releasing each lens 100 from its respective mold part 102.

In some embodiments, a heat exchanger 307 is used to maintain the temperature of the hydration solution at a temperature greater than typical ambient room temperature. For example, and without limitation, a heat exchanger can be used to raise the temperature of the hydration solution to about 30° C. to about 72° C.

Lens Materials

Ophthalmic lenses suitable for use with the current invention include those made from silicone hydrogels. Silicone hydrogels offer benefits to ophthalmic lens wearers as compared to conventional hydrogels. For example, they typically offer much higher oxygen permeability, Dk, or oxygen oxygen/transmissibility, Dk/l, where l is the thickness of the lens. Such lenses cause reduced corneal swelling due to reduced hypoxia, and may cause less limbal redness, improved comfort and have a reduced risk of adverse responses such as bacterial infections. Silicone hydrogels are typically made by combining silicone-containing monomers or macromers with hydrophilic monomers or macromers.

Some embodiments can include ophthalmic lenses of the present invention which are prepared by mixing a high molecular weight hydrophilic polymer, the hydroxyl-functionalized silicone-containing monomer, plus one or more of the following: the additional silicone containing monomers, the hydrophilic monomers, the additives ("Reactive Components"), and the diluents (collectively, the "Reaction Mixture"), and a polymerization initiator and one or more of: with PEG, such as PEG 2000 and PEO. The Reaction Mixture is then cured.

According to the present invention, the one or more of: PEG and PEO is included in the Reaction Mixture in an amount effective to facilitate release of the formed lens. As used herein, an amount effective to facilitate release is an amount that demonstrates a shorter release time under similar conditions as compared to an equivalent Reaction Mixture that does not include the at least one of: PEO and PEG. For example, in some preferred embodiments, 0.05 to 10.0% weight of PEG 2000 can be added to the monomer mix to facilitate release and more preferably 0.05 to 5.0% weight of PEG 2000 and most preferably 0.10 to 3% weight of PEG 2000 can be added to the Reaction Mixture to facilitate release of the ophthalmic lens from the mold part.

Examples of silicone containing monomers include SiGMA, α,ω-bismethacryloxypropylpolydimethylsiloxane, mPDMS (monomethacryloxypropyl terminated mono-n-butyl terminated polydimethylsiloxane) and TRIS (3-methacryloxypropyltris(trimethylsiloxy)silane).

Examples of hydrophilic monomers include HEMA (2-hydroxyethylmethacrylate), DMA (N,N-dimethylacrylamide) and NVP (N-vinylpyrrolidone).

In some embodiments, high molecular weight polymers may be added to monomer mixes and serve the function of internal wetting agents. Some embodiments can also include additional components or additives, which are generally known in the art. Additives can include, for example: ultraviolet absorbing compounds and monomer, reactive tints, antimicrobial compounds, pigments, photochromic, release agents, combinations thereof and the like.

The silicone monomers and macromers are blended with the hydrophilic monomers or macromers, placed into ophthalmic lens molds, and cured by exposing the monomer to one or more conditions capable of causing polymerization of the monomer. Such conditions can include, for example: heat and light, wherein the light may include one or more of: visible, ionizing, actinic, X-ray, electron beam or ultra violet (hereinafter "UV") light. In some embodiments, the light utilized to cause polymerization can have a wavelength of about 250 to about 700 nm. Suitable radiation sources include UV lamps, fluorescent lamps, incandescent lamps, mercury vapor lamps, and sunlight. In embodiments, where a UV absorbing compound is included in the monomer composition (for example, as a UV block), curing can be conducted by means other than UV irradiation (such as, for example, by visible light or heat).

In some embodiments a radiation source, used to facilitate curing can be selected from UVA (about 315-about 400 nm), UVB (about 280-about 315) or visible light (about 400-about 450 nm), at low intensity. Some embodiments can also include a reaction that mixture includes a UV absorbing compound.

In some embodiments, wherein the lenses are cured using heat then a thermal initiator may be added to the monomer mix. Such initiators can include one or more of: peroxides such as benzoyl peroxide and azo compounds such as AIBN (azobisisobutyronirile).

In some embodiments, lenses can be cured using UV or visible light and a photoinitiator may be added to the monomer mix. Such photoinitiators may include, for example, aromatic alpha-hydroxy ketones, alkoxyoxybenzoins, acetophenones, acyl phosphine oxides, and a tertiary amine plus a diketone, mixtures thereof and the like. Illustrative examples of photoinitiators are 1-hydroxycyclohexyl phenyl ketone, 2-hydroxy-2-methyl-1-phenyl-propan-1-one, bis(2, 6-dimethoxybenzoyl)-2,4-4-trimethylpentyl phosphine oxide (DMBAPO), bis(2,4,6-trimethylbenzoyl)-phenylphosphineoxide (Irgacure 819), 2,4,6-trimethylbenzyldiphenyl phosphine oxide and 2,4,6-trimethylbenzyoyl diphenylphosphine oxide, benzoin methyl ester and a combination of camphorquinone and ethyl 4-(N,N-dimethylamino)benzoate. Commercially available visible light initiator systems include Irgacure 819, Irgacure 1700, Irgacure 1800, Irgacure 819, Irgacure 1850 (all from Ciba Specialty Chemicals) and Lucirin TPO initiator (available from BASF). Commercially available UV photoinitiators include Darocur 1173 and Darocur 2959 (Ciba Specialty Chemicals).

In some embodiments, it may also be useful to include diluents in the monomer mix, for example to improve the solubility of the various components, or to increase the clarity or degree of polymerization of the polymer to be formed. Embodiments can include secondary and tertiary alcohols as diluents.

Various processes are known for processing the reaction mixture in the production of ophthalmic lenses, including known spincasting and static casting. In some embodiments, a method for producing an ophthalmic lens from a polymer includes molding silicone hydrogels. Silicone hydrogel molding can be efficient and provides for precise control over the final shape of a hydrated lens.

As used herein, curing the monomer mix includes a process or condition which allows or facilitates the polymerization of the monomer mix. Examples of conditions which facilitate polymerization include one or more of: exposure to light and application of thermal energy.

Silicone hydrogel lenses may be made using relatively hydrophobic diluents such as 3,7-dimethyl-3-octanol. If one attempts to release such lenses in water, such diluents prevent absorption of water, and do not allow sufficient swelling to case release of the lens.

Alternatively, silicone hydrogels may be made using relatively hydrophilic and water soluble diluents such as ethanol, t-butanol or t-amyl alcohol. When such diluents are used and the lens and mold are placed into water, the diluent may more easily dissolve and the lens may more easily release in water than if more hydrophobic diluents are used.

High Molecular Weight Hydrophilic Polymer

The preferred weight average molecular weight of these high molecular weight hydrophilic polymers is greater than about 150,000; more preferably between about 150,000 to about 2,000,000 Daltons, more preferably still between about 300,000 to about 1,800,000 Daltons, most preferably about 500,000 to about 1,500,000 Daltons.

Alternatively, the molecular weight of hydrophilic polymers of the invention can be also expressed by the K-value, based on kinematic viscosity measurements, as described in Encyclopedia of Polymer Science and Engineering, N-Vinyl Amide Polymers, Second edition, Vol 17, pgs. 198-257, John Wiley & Sons Inc. When expressed in this manner, hydrophilic monomers having K-values of greater than about 46 and preferably between about 46 and about 150. The high molecular weight hydrophilic polymers are present in the formulations of these devices in an amount sufficient to provide contact lenses, which without surface modification remain substantially free from surface depositions during use. Typical use periods include at least about 8 hours, and preferably worn several days in a row, and more preferably for 24 hours or more without removal. Substantially free from surface deposition means that, when viewed with a slit lamp, at least about 70% and preferably at least about 80%, and more preferably about 90% of the lenses worn in the patient population display depositions rated as none or slight, over the wear period.

Suitable amounts of high molecular weight hydrophilic polymer include from about 1 to about 15 weight percent, more preferably about 3 to about 15 percent, most preferably about 5 to about 12 percent, all based upon the total of all reactive components.

Examples of high molecular weight hydrophilic polymers include but are not limited to polyamides, polylactones, polyimides, polylactams and functionalized polyamides, polylactones, polyimides, polylactams, such as DMA functionalized by copolymerizing DMA with a lesser molar amount of a hydroxyl-functional monomer such as HEMA, and then reacting the hydroxyl groups of the resulting copolymer with materials containing radical polymerizable groups, such as isocyanatoethylmethacrylate or methacryloyl chloride. Hydrophilic prepolymers made from DMA or n-vinyl pyrrolidone with glycidyl methacrylate may also be used. The glycidyl methacrylate ring can be opened to give a diol which may be used in conjunction with other hydrophilic prepolymer in a mixed system to increase the compatibility of the high molecular weight hydrophilic polymer, hydroxyl-functionalized silicone containing monomer and any other groups which impart compatibility. The preferred high molecular weight hydrophilic polymers are those that contain a cyclic moiety in their backbone, more preferably, a cyclic amide or cyclic imide. High molecular weight hydrophilic polymers include but are not limited to poly-N-vinyl pyrrolidone, poly-N-vinyl-2-piperidone, poly-N-vinyl-2-caprolactam, poly-N-vinyl-3-methyl-2-caprolactam, poly-N-vinyl-3-methyl-2-piperidone, poly-N-vinyl-4-methyl-2-piperidone, poly-N-vinyl-4-methyl-2-caprolactam, poly-N-vinyl-3-ethyl-2-pyrrolidone, and poly-N-vinyl4,5-dimethyl-2-pyrrol-idone, polyvinylimidazole, poly-N-N-dimethylacrylamide, polyvinyl alcohol, polyacrylic acid, polyethylene oxide, poly 2 ethyl oxazoline, heparin polysaccharides, polysaccharides, mixtures and copolymers (including block or random, branched, multichain, comb-shaped or star shaped) thereof where poly-N-vinylpyrrolidone (PVP) is particularly preferred. Copolymers might also be used such as graft copolymers of PVP.

The high molecular weight hydrophilic polymers provide improved wettability, and particularly improved in vivo wettability to the medical devices of the present invention. Without being bound by any theory, it is believed that the high molecular weight hydrophilic polymers are hydrogen bond receivers which in aqueous environments, hydrogen bond to water, thus becoming effectively more hydrophilic. The absence of water facilitates the incorporation of the hydrophilic polymer in the reaction mixture. Aside from the specifically named high molecular weight hydrophilic polymers, it is expected that any high molecular weight polymer will be useful in this invention provided that when said polymer is added to a silicone hydrogel formulation, the hydrophilic polymer (a) does not substantially phase separate from the reaction mixture and (b) imparts wettability to the resulting cured polymer. In some embodiments it is preferred that the high molecular weight hydrophilic polymer be soluble in the diluent at processing temperatures. Manufacturing processes which use water or water soluble diluents may be preferred due to their simplicity and reduced cost. In these embodiments high molecular weight hydrophilic polymers which are water soluble at processing temperatures are preferred.

Hydroxyl-Functionalized Silicone Containing Monomer

As used herein a "hydroxyl-functionalized silicone containing monomer" is a compound containing at least one polymerizable group having an average molecular weight of about less than 5000 Daltons as measured via gel permeation chromatography, refractive index detection, and preferably less than about 3000 Daltons, which is capable of compatibilizing the silicone containing monomers included in the hydrogel formulation with the hydrophilic polymer. Hydroxyl functionality is very efficient at improving hydrophilic compatibility. Thus, in a preferred embodiment hydroxyl-functionalized silicone containing monomers of the present invention comprise at least one hydroxyl group and at least one "—Si—O—Si—"group. It is preferred that silicone and its attached oxygen account for more than about 10 weight percent of said hydroxyl-functionalized silicone containing monomer, more preferably more than about 20 weight percent.

The ratio of Si to OH in the hydroxyl-functionalized silicone containing monomer is also important to providing a hydroxyl functionalized silicone containing monomer which will provide the desired degree of compatibilization. If the ratio of hydrophobic portion to OH is too high, the hydroxyl-functionalized silicone monomer may be poor at compatibilizing the hydrophilic polymer, resulting in incompatible reaction mixtures. Accordingly, in some embodiments, the Si to OH ratio is less than about 15:1, and preferably between about 1:1 to about 10:1. In some embodiments primary alcohols have provided improved compatibility compared to secondary alcohols. Those of skill in the art will appreciate that the amount and selection of hydroxyl-functionalized silicone containing monomer will depend on how much hydrophilic polymer is needed to achieve the desired wettability and the degree to which the silicone containing monomer is incompatible with the hydrophilic polymer.

Examples of hydroxyl-functionalized silicone containing monomers include monomers of Formulae I and II

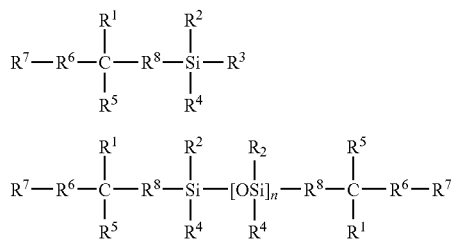

wherein:

n is an integer between 3 and 35, and preferably between 4 and 25;

$R^1$ is hydrogen, $C_{1-6}$alkyl;

$R^2$, $R^3$, and $R^4$, are independently, $C_{1-6}$alkyl, tri$C_{1-6}$alkylsiloxy, phenyl, naphthyl, substituted $C_{1-6}$alkyl, substituted phenyl, or substituted naphthyl where the alkyl substitutents are selected from one or more members of the group consisting of $C_{1-6}$alkoxycarbonyl, $C_{1-6}$alkyl, $C_{1-6}$alkoxy, amide, halogen, hydroxyl, carboxyl, $C_{1-6}$alkylcarbonyl and formyl, and where the aromatic substitutents are selected from one or more members of the group consisting of $C_{1-6}$alkoxycarbonyl, $C_{1-6}$alkyl, $C_{1-6}$alkoxy, amide, halogen, hydroxyl, carboxyl, $C_{1-6}$alkylcarbonyl and formyl;

$R^5$ is hydroxyl, an alkyl group containing one or more hydroxyl groups; or $(CH_2(CR^9R^{10})_yO)_x)$—$R^{11}$ wherein y is 1 to 5, preferably 1 to 3, x is an integer of 1 to 100, preferably 2 to 90 and more preferably 10 to 25; $R^9$-$R^{11}$ are independently selected from H, alkyl having up to 10 carbon atoms and alkyls having up to 10 carbon atoms substituted with at least one polar functional group, $R^6$ is a divalent group comprising up to 20 carbon atoms;

$R^7$ is a monovalent group that can under free radical and/or cationic polymerization and comprising up to 20 carbon atoms $R^8$ is a divalent or trivalent group comprising up to 20 carbon atoms.

Reaction mixtures of the present invention may include more than one hydroxyl-functionalized silicone containing monomer.

For monofunctional hydroxyl functionalized silicone containing monomer the preferred $R^1$ is hydrogen, and the preferred $R^2$, $R^3$, and $R^4$, are $C_{1-6}$alkyl and tri$C_{1-6}$alkylsiloxy, most preferred methyl and trimethylsiloxy. For multifunctional (difunctional or higher) $R^1$-$R^4$ independently comprise ethylenically unsaturated polymerizable groups and more preferably comprise an acrylate, a styryl, a $C_{1-6}$alkylacrylate, acrylamide, $C_{1-6}$alkylacrylamide, N-vinyllactam, N-vinylamide, $C_{2-12}$alkenyl, $C_{2-12}$alkenylphenyl, $C_{2-12}$alkenylnaphthyl, or $C_{2-6}$alkenylphenyl$C_{1-6}$alkyl.

The preferred $R^5$ is hydroxyl, —$CH_2OH$ or $CH_2CHOHCH_2OH$, with hydroxyl being most preferred.

The preferred $R^6$ is a divalent $C_{1-6}$alkyl, $C_{1-6}$alkyloxy, $C_{1-6}$alkyloxy$C_{1-6}$alkyl, phenylene, naphthalene, $C_{1-2}$cycloalkyl, $C_{1-6}$alkoxycarbonyl, amide, carboxy, $C_{1-6}$alkylcarbonyl, carbonyl, $C_{1-6}$alkoxy, substituted $C_{1-6}$alkyl, substituted $C_{1-6}$alkyloxy, substituted $C_{1-6}$alkyloxy$C_{1-6}$alkyl, substituted phenylene, substituted naphthalene, substituted $C_{1-2}$cycloalkyl, where the substituents are selected from one or more members of the group consisting of $C_{1-6}$alkoxycarbonyl, $C_{1-6}$alkyl, $C_{1-6}$alkoxy, amide, halogen, hydroxyl, carboxyl, $C_{1-6}$alkylcarbonyl and formyl. The particularly preferred $R^6$ is a divalent methyl(methylene).

The preferred $R^7$ comprises a free radical reactive group, such as an acrylate, a styryl, vinyl, vinyl ether, itaconate group, a $C_{1-6}$alkylacrylate, acrylamide, $C_{1-6}$alkylacrylamide, N-vinyllactam, N-vinylamide, $C_{2-12}$alkenyl, $C_{2-12}$alkenylphenyl, $C_{2-12}$alkenylnaphthyl, or $C_{2-6}$alkenylphenyl$C_{1-6}$ alkyl or a cationic reactive group such as vinyl ether or epoxide groups. The particularly preferred $R^7$ is methacrylate.

The preferred $R^8$ is is a divalent $C_{1-6}$alkyl, $C_{1-6}$alkyloxy, $C_{1-6}$alkyloxy$C_{1-6}$alkyl, phenylene, naphthalene, $C_{1-12}$cycloalkyl, $C_{1-6}$alkoxycarbonyl, amide, carboxy, $C_{1-6}$alkylcarbonyl, carbonyl, $C_{1-6}$alkoxy, substituted $C_{1-6}$alkyl, substituted $C_{1-6}$alkyloxy, substituted $C_{1-6}$alkyloxy$C_{1-6}$alkyl, substituted phenylene, substituted naphthalene, substituted $C_{1-2}$cycloalkyl, where the substituents are selected from one or more members of the group consisting of $C_{1-6}$alkoxycarbonyl, $C_{1-6}$alkyl, $C_{1-6}$alkoxy, amide, halogen, hydroxyl, carboxyl, $C_{1-6}$alkylcarbonyl and formyl. The particularly preferred $R^8$ is $C_{1-6}$alkyloxy$C_{1-6}$alkyl.

Examples of hydroxyl-functionalized silicone containing monomer of Formula I that are particularly preferred are 2-propenoic acid, 2-methyl-,2-hydroxy-3-[3-[1,3,3,3-tetramethyl-1-[(trimethylsilyl)oxy]disiloxanyl]propoxy]propyl ester (which can also be named (3-methacryloxy-2-hydroxypropyloxy)propylbis(trimethylsiloxy)methylsilane)

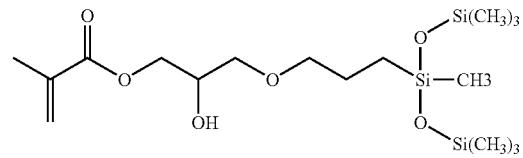

The above compound, (3-methacryloxy-2-hydroxypropyloxy)propylbis(trimethylsiloxy)methylsilane is formed from an epoxide, which produces an 80:20 mixture of the compound shown above and (2-methacryloxy-3-hydroxypropyloxy)propylbis(trimethylsiloxy)methylsilane. In some embodiments of the present invention it is preferred to have some amount of the primary hydroxyl present, preferably greater than about 10 wt % and more preferably at least about 20 wt %.

Other suitable hydroxyl-functionalized silicone containing monomers include (3-methacryloxy-2-hydroxypropyloxy) propyltris(trimethylsiloxy)silane

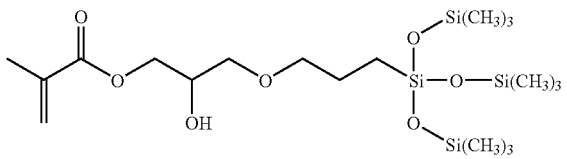

bis-3-methacryloxy-2-hydroxypropyloxypropyl polydimethylsiloxane

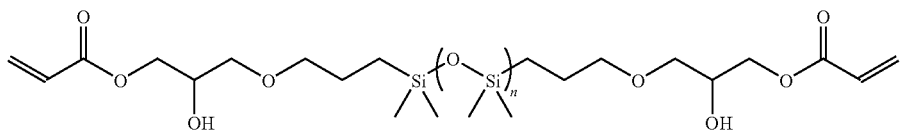

3-methacryloxy-2-(2-hydroxyethoxy)propyloxy)propylbis(trimethylsiloxy)methylsilane

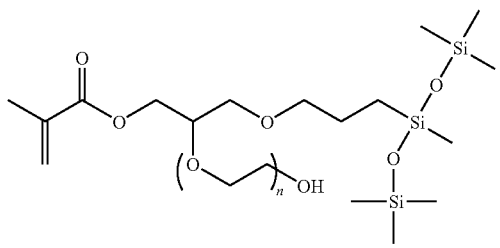

N,N,N',N'-tetrakis(3-methacryloxy-2-hydroxypropyl)-α,ω-bis-3-aminopropyl-polydimethylsiloxane.

The reaction products of glycidyl methacrylate with amino-functional polydimethylsiloxanes may also be used as a hydroxyl-functional silicone containing monomer.

Still additional structures which may be suitable hydroxyl-functionalized silicone containing monomers include those similar to the compounds disclosed in Pro. ACS Div. Polym. Mat. Sci. Eng., Apr. 13-17, 1997, p. 42, and having the following structure:

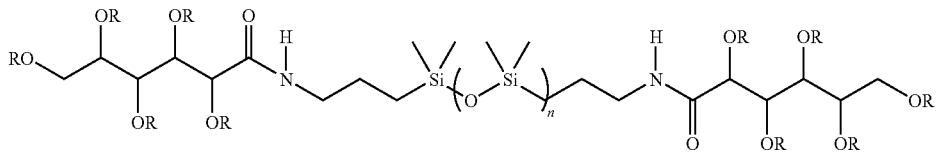

where n=1-50 and R independently comprise H or a polymerizable unsaturated group, with at least one R comprising a polymerizable group, and at least one R, and preferably 3-8 R, comprising H.

These components may be removed from the hydroxyl-functionalized monomer via known methods such as liquid phase chromatography, distillation, recrystallization or extraction, or their formation may be avoided by careful selection of reaction conditions and reactant ratios.

Suitable monofunctional hydroxyl-functionalized silicone monomers are commercially available from Gelest, Inc. Morrisville, Pa. Suitable multifunctional hydroxyl-functionalized silicone monomers are commercially available from Gelest, Inc, Morrisville, Pa. or may be made using the procedures disclosed in U.S. Pat. Nos. 5,994,488 and 5,962,548.

While hydroxyl-functionalized silicone containing monomers have been found to be particularly suitable for providing compatible polymers for biomedical devices, and particularly ophthalmic devices, any functionalized silicone containing monomer which, when polymerized and/or formed into a final article is compatible with the selected hydrophilic components may be used. Suitable functionalized silicone containing monomers may be selected using the following monomer compatibility test. In this test one gram of each of mono-3-methacryloxypropyl terminated, mono-butyl terminated polydimethylsiloxane (mPDMS MW 800-1000) and a monomer to be tested are mixed together in one gram of 3,7-dimethyl-3-octanol at about 20° C. A mixture of 12 weight parts K-90 PVP and 60 weight parts DMA is added drop-wise to hydrophobic component solution, with stirring, until the solution remains cloudy after three minutes of stirring. The mass of the added blend of PVP and DMA is determined in grams and recorded as the monomer compatibility index. Any hydroxyl-functionalized silicone-containing monomer having a compatibility index of greater than 0.2 grams, more preferably greater than about 0.7 grams and most preferably greater than about 1.5 grams will be suitable for use in this invention.

An "effective amount" or a "compatibilizing effective amount" of the hydroxyl-functionalized silicone-containing monomers of the invention is the amount needed to compatibilize or dissolve the high molecular weight hydrophilic polymer and the other components of the polymer formulation. Thus, the amount of hydroxyl-functional silicone containing monomer will depend in part on the amount of hydrophilic polymer which is used, with more hydroxyl-functionalized silicone containing monomer being needed to compatibilize higher concentrations of hydrophilic polymer. Effective amounts of hydroxyl-functionalized silicone containing monomer in the polymer formulation include about 5% (weight percent, based on the weight percentage of the reactive components) to about 90%, preferably about 10% to about 80%, most preferably, about 20% to about 50%.

In addition to the high molecular weight hydrophilic polymers and the hydroxyl-functionalized silicone containing monomers of the invention other hydrophilic and hydrophobic monomers, crosslinkers, additives, diluents, polymerization initators may be used to prepare the biomedical devices of the invention. In addition to high molecular weight hydrophilic polymer and hydroxyl-functionalized silicone containing monomer, the hydrogel formulations may include additional silicone containing monomers, hydrophilic monomers, and cross linkers to give the biomedical devices of the invention.

Additional Silicone Containing Monomers

With respect to the additional silicone containing monomers, useful amide analogs of TRIS can include, 3-methacryloxypropyltris(trimethylsiloxy)silane (TRIS), monomethacryloxypropyl terminated polydimethylsiloxanes, polydimethylsiloxanes, 3-methacryloxypropylbis(trimethylsiloxy)methylsila-ne, methacryloxypropylpentamethyl disiloxane and combinations thereof are particularly useful as additional silicone-containing monomers of the invention. Additional silicone containing monomers may be present in amounts of about 0 to about 75 wt %, more preferably of about 5 and about 60 and most preferably of about 10 and 40 weight %.

Hydrophilic Monomers

Additionally, reaction components of the present invention may also include any hydrophilic monomers used to prepare conventional hydrogels. For example monomers containing acrylic groups ($CH_2$.dbd.CRCOX, where R is hydrogen or $C_{1-6}$alkyl an X is O or N) or vinyl groups (—C.dbd.$CH_2$) may be used. Examples of additional hydrophilic monomers are N,N-dimethylacrylamide, 2-hydroxyethyl methacrylate, glycerol monomethacrylate, 2-hydroxyethyl methacrylamide, polyethyleneglycol monomethacrylate, methacrylic acid, acrylic acid, N-vinyl pyrrolidone, N-vinyl-N-methyl acetamide, N-vinyl-N-ethyl acetamide, N-vinyl-N-ethyl formamide, N-vinyl formamide and combinations thereof.

Aside the additional hydrophilic monomers mentioned above, polyoxyethylene polyols having one or more of the terminal hydroxyl groups replaced with a functional group containing a polymerizable double bond may be used. Examples include polyethylene glycol, ethoxylated alkyl glucoside and ethoxylated bisphenol A, reacted with one or more molar equivalents of an end-capping group such as isocyanatoethyl methacrylate, methacrylic anhydride, methacryloyl chloride, vinylbenzoyl chloride, and the like, produce a polyethylene polyol having one or more terminal polymerizable olefinic groups bonded to the polyethylene polyol through linking moieties such as carbamate, urea or ester groups.

Still further examples include the hydrophilic vinyl carbonate or vinyl carbamate monomers, hydrophilic oxazolone monomers and polydextran.

Additional hydrophilic monomers can include N,N-dimethylacrylamide (DMA), 2-hydroxyethyl methacrylate (HEMA), glycerol methacrylate, 2-hydroxyethyl methacrylamide, N-vinylpyrrolidone (NVP), polyethyleneglycol monomethacrylate, methacrylic acid, acrylic acid and combinations thereof. Additional hydrophilic monomers may be present in amounts of about 0 to about 70 wt %, more preferably of about 5 and about 60 and most preferably of about 10 and 50 weight %.

Crosslinkers

Suitable crosslinkers are compounds with two or more polymerizable functional groups. The crosslinker may be hydrophilic or hydrophobic and in some embodiments of the present invention mixtures of hydrophilic and hydrophobic crosslinkers have been found to provide silicone hydrogels with improved optical clarity (reduced haziness compared to a CSI Thin Lens). Examples of suitable hydrophilic crosslinkers include compounds having two or more polymerizable functional groups, as well as hydrophilic functional groups such as polyether, amide or hydroxyl groups. Specific examples include TEGDMA (tetraethyleneglycol dimethacrylate), TrEGDMA (triethyleneglycol dimethacrylate), ethyleneglycol dimethacylate (EGDMA), ethylenediamine dimethyacrylamide, glycerol dimethacrylate and combinations thereof Examples of suitable hydrophobic crosslinkers include multifunctional hydroxyl-functionalized silicone containing monomer, multifunctional polyether-polydimethylsiloxa-ne block copolymers, combinations thereof and the like. Specific hydrophobic crosslinkers include acryloxypropyl terminated polydimethylsiloxane (n=10 or 20) (acPDMS), hydroxylacrylate functionalized siloxane macromer, methacryloxypropyl terminated PDMS, butanediol dimethacrylate, divinyl benzene, 1,3-bis(3-methacryloxypropyl)-tetrakis(trimethylsiloxy)disiloxane and mixtures thereof. Preferred crosslinkers include TEGDMA, EGDMA, acPDMS and combinations thereof. The amount of hydrophilic crosslinker used is generally about 0 to about 2 weight % and preferably from about 0.5 to about 2 weight % and the amount of hydrophobic crosslinker is about 0 to about 5 weight %, which can alternatively be referred to in mol % of about 0.01 to about 0.2 mmole/gm reactive components, preferably about 0.02 to about 0.1 and more preferably 0.03 to about 0.6 mmole/gm.

Increasing the level of crosslinker in the final polymer has been found to reduce the amount of haze. However, as crosslinker concentration increases above about 0.15 mmole/gm reactive components modulus may increase above generally desired levels (greater than about 90 psi). Thus, in some embodiments of the present invention the crosslinker composition and amount is selected to provide a crosslinker concentration in the reaction mixture of between about 0.01 and about 0.1 mmoles/gm crosslinker.

Additional components or additives, which are generally known in the art may also be included. Additives include but are not limited to ultra-violet absorbing compounds and monomer, reactive tints, antimicrobial compounds, pigments, photochromic, release agents, combinations thereof and the like.

Additional components include other oxygen permeable components such as carbon-carbon triple bond containing monomers and fluorine containing monomers which are known in the art and include fluorine-containing (meth)acrylates, and more specifically include, for example, fluorine-containing $C_2$-$C_{12}$ alkyl esters of (meth)acrylic acid such as 2,2,2-trifluoroethyl(meth)acrylate, 2,2,2,2',2',2'-hexafluoroisopropyl(meth)acrylate, 2,2,3,3,4,4,4-heptafluorobutyl (meth)acrylate, 2,2,3,3,4,4,5,5,6,6,7,7,8,-8,8-pentadecafluorooctyl(meth)acrylate, 2,2,3,3,4,4,5,5,6,6,7,7,8,8,9,9-hexadecafluorononyl(meth)acrylate and the like.

Diluents

The reaction components (hydroxyl-functionalized silicone containing monomer, hydrophilic polymer, crosslinker(s) and other components) are generally mixed and reacted in the absence of water and optionally, in the presence of at least one diluent to form a reaction mixture. The type and amount of diluent used also effects the properties of the resultant polymer and article. The haze and wettability of the final article may be improved by selecting relatively hydrophobic diluents and/or decreasing the concentration of diluent used. As discussed above, increasing the hydrophobicity of the diluent may also allow poorly compatible components (as measured by the compatibility test) to be processed to form a compatible polymer and article. However, as the diluent becomes more hydrophobic, processing steps necessary to replace the diluent with water will require the use of solvents other than water. This may undesirably increase the complexity and cost of the manufacturing process. Thus, it is important to select a diluent which provides the desired compatibility to the components with the necessary level of processing convenience. Diluents useful in preparing the devices of this invention include ethers, esters, alkanes, alkyl halides, silanes, amides, alcohols and combinations thereof. Amides and alcohols are preferred diluents, and secondary and tertiary alcohols are most preferred alcohol diluents. Examples of ethers useful as diluents for this invention include tetrahydrofuran, tripropylene glycol methyl ether, dipropylene glycol methyl ether, ethylene glycol n-butyl ether, diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimetyl ether, polyethylene glycols, polypropylene glycols and mixtures thereof. Examples of esters useful for this invention include ethyl acetate, butyl acetate, amyl acetate, methyl lactate, ethyl lactate, i-propyl lactate. Examples of alkyl halides useful as diluents for this invention include methylene chloride. Examples of silanes useful as diluents for this invention include octamethylcyclotetrasiloxane.

Examples of alcohols useful as diluents for this invention include those having the formula 7 wherein R, R' and R" are independently selected from H, a linear, branched or cyclic monovalent alkyl having 1 to 10 carbons which may optionally be substituted with one or more groups including halogens, ethers, esters, aryls, amines, amides, alkenes, alkynes, carboxylic acids, alcohols, aldehydes, ketones or the like, or any two or all three of R, R and R" can together bond to form one or more cyclic structures, such as alkyl having 1 to 10 carbons which may also be substituted as just described, with the proviso that no more than one of R, R' or R" is H.

It is preferred that R, R' and R" are independently selected from H or unsubstituted linear, branched or cyclic alkyl groups having 1 to 7 carbons. It is more preferred that R, R', and R" are independently selected form unsubstituted linear, branched or cyclic alkyl groups having 1 to 7 carbons. In certain embodiments, the preferred diluent has 4 or more, more preferably 5 or more total carbons, because the higher molecular weight diluents have lower volatility, and lower flammability. When one of the R, R' and R" is H, the structure forms a secondary alcohol. When none of the R, R' and R" are H, the structure forms a tertiary alcohol. Tertiary alcohols are more preferred than secondary alcohols. The diluents are preferably inert and easily displaceable by water when the total number of carbons is five or less. Examples of useful secondary alcohols include 2-butanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, and the like.

Examples of useful tertiary alcohols include tert-butanol, tert-amyl, alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-3-pentanol, 3,7-dimethyl-3-octanol, 2-phenyl-2-butanol, 2-methyl-1-phenyl-2-propanol and 3-ethyl-3-pentanol, and the like.

A single alcohol or mixtures of two or more of the above-listed alcohols or two or more alcohols according to the structure above can be used as the diluent to make the polymer of this invention.

In certain embodiments, the preferred alcohol diluents are secondary and tertiary alcohols having at least 4 carbons. In particular, some alcohol diluents can include tert-butanol, tert-amyl alcohol, 2-butanol, 2-methyl-2-pentanol, 2,3-dimethyl-2-butanol, 3-methyl-3-pentanol, 3-ethyl-3-pentanol, 3,7-dimethyl-3-octanol.

Diluents can also include: hexanol, heptanol, octanol, nonanol, decanol, tert-butyl alcohol, 3-methyl-3-pentanol, isopropanol, t amyl alcohol, ethyl lactate, methyl lactate, i-propyl lactate, 3,7-dimethyl-3-octanol, dimethyl formamide, dimethyl acetamide, dimethyl propionamide, N methyl pyrrolidinone and mixtures thereof.

In some embodiments of the present invention the diluent is water soluble at processing conditions and readily washed out of the lens with water in a short period of time. Suitable water soluble diluents include 1-ethoxy-2-propanol, 1-methyl-2-propanol, t-amyl alcohol, tripropylene glycol methyl ether, isopropanol, 1-methyl-2-pyrrolidone, N,N-dimethyl-propionamide, ethyl lactate, dipropylene glycol methyl ether, mixtures thereof and the like. The use of a water soluble diluent allows the post molding process to be conducted using water only or aqueous solutions which comprise water as a substantial component.

In some embodiments, the amount of diluent can be generally less than about 50 weight % of the reaction mixture and preferably less than about 40% and more preferably between about 10 and about 30%. In some embodiments, diluent may also include additional components such as release agents and can include water soluble and aid in lens deblocking.

Polymerization initiators can include, for example, compounds such as: lauryl peroxide, benzoyl peroxide, isopropyl percarbonate, azobisisobutyronitrile, and the like, that generate free radicals at moderately elevated temperatures, and photoinitiator systems such as aromatic alpha-hydroxy ketones, alkoxyoxybenzoins, acetophenones, acyl phosphine oxides, and a tertiary amine plus a diketone, mixtures thereof and the like. Illustrative examples of photoinitiators are 1-hydroxycyclohexyl phenyl ketone, 2-hydroxy-2-methyl-1-phenyl-propan-1-o-ne, bis(2,6-dimethoxybenzoyl)-2,4-4-trimethylpentyl phosphine oxide (DMBAPO), bis(2,4,6-trimethylbenzoyl)-phenylphosphineoxide (Irgacure 819), 2,4,6-trimethylbenzyldiphenyl phosphine oxide and 2,4,6-trimethylbenzyoyl diphenylphosphine oxide, benzoin methyl ester and a combination of camphorquinone and ethyl 4-(N, N-dimethylamino)benzoate. Commercially available visible light initiator systems include Irgacure 819, Irgacure 1700, Irgacure 1800, Irgacure 819, Irgacure 1850 (all from Ciba Specialty Chemicals) and Lucirin TPO initiator (available from BASF). Commercially available UV photoinitiators include Darocur 1173 and Darocur 2959 (Ciba Specialty Chemicals). The initiator is used in the reaction mixture in effective amounts to initiate photopolymerization of the reaction mixture, e.g., from about 0.1 to about 2 parts by weight per 100 parts of reactive monomer. Polymerization of the reaction mixture can be initiated using the appropriate choice of heat or visible or ultraviolet light or other means depending on the polymerization initiator used. Alternatively, initiation can be conducted without a photoinitiator using, for example, e-beam. However, when a photoinitiator is used, some embodiments can include a combination of 1-hydroxycyclohexyl phenyl ketone and bis(2,6-dimethoxybenzoyl)-2,4,4-trimethylpentyl phosphine oxide (DMBAPO), and the method of polymerization initiation can include visible light. Other embodiments can include: bis(2,4,6-trimethylbenzoyl)-phenylphosphineoxide (Irgacure 819®).

In some embodiments, the present invention can further include ophthalmic lenses of the formulae: 1 Wt % components HFSCM HMWHP SCM HM 5-90 1-15, 3-15 or 5-12 0 0 10-80 1-15, 3-15 or 5-12 0 0 20-50 1-15, 3-15 or 5-12 0 0 5-90 1-15, 3-15 or 5-12 0-80, 5-60 or 10-0-70, 5-60 or 10-40 50 10-80 1-15, 3-15 or 5-12 0-80, 5-60 or 10-0-70, 5-60 or 10-40 50 20-50 1-15, 3-15 or 5-12 0-80, 5-60 or 10-0-70, 5-60 or 10-40 50 HFSCM is hydroxyl-functionalized silicone containing monomer HMWHP is high molecular weight hydrophilic polymer SCM is silicone containing monomer HM is hydrophilic monomer.

The weight percents above can be based upon all reactive components. Thus, in some embodiments, the present invention can include one or more of: silicone hydrogels, biomedical devices, ophthalmic devices and contact lenses, each of one or more of the compositions listed in the table, which describes ninety possible compositional ranges. Each of the ranges considered can be prefixed with "about", whereby the range combinations presented with the proviso that the listed components, and any additional components add up to 100 weight %.

A range of the combined silicone-containing monomers (hydroxyl-functionalized silicone-containing and additional silicone-containing monomers) can be from about 5 to 99 weight percent, more preferably about 15 to 90 weight percent, and in some embodiments about 25 to about 80 weight percent of the reaction components. A range of hydroxyl-functionalized silicone-containing monomer can be about 5 to about 90 weight percent, preferably about 10 to about 80, and most preferably about 20 to about 50 weight percent. In some embodiments a range of hydrophilic monomer can be from about 0 to about 70 weight percent, more preferably about 5 to about 60 weight percent, and most preferably about 10 to about 50 weight percent of the reactive components. In other embodiments a range of high molecular weight hydrophilic polymer can be about 1 to about 15 weight percent, or about 3 to about 15 weight percent, or about 5 to about 12 weight percent. All of the about weight percents are based upon the total of all reactive components.

In some embodiments, a range of diluent is from about 0 to about 70 weight percent, or 0 to about 50 weight percent, and or about 0 to about 40 weight percent and in some embodiments, between about 10 and about 30 weight percent, based upon the weight all component in the reactive mixture. The amount of diluent required varies depending on the nature and relative amounts of the reactive components.

In some embodiments, the reactive components comprise 2-propenoic acid, 2-methyl-,2-hydroxy-3-[3-[1,3,3,3-tetramethyl-1-[(trime-thylsilyl)oxy]disiloxanyl]propoxy]propyl ester "SiGMA" .about.28 wgt. % of the reaction components); (800-1000 MW monomethacryloxypropyl terminated mono-n-butyl terminated polydimethylsiloxane, "mPDMS" (.about.31% wt); N,N-dimethylacrylamide, "DMA" (.about.24% wt); 2-hydroxyethyl methacryate, "HEMA" (.about.6% wt); tetraethyleneglycoldimethacrylate, "TEGDMA" (.about. 1.5% wt), polyvinylpyrrolidone, "K-90 PVP" (.about.7% wt); with the balance comprising minor amounts of additives and photoinitiators. The polymerization can also be conducted in the presence of about 23% (weight % of the combined monomers and diluent blend) 3,7-dimethyl-3-octanol diluent.

In some embodiments, the polymerizations for the above formulations can be conducted in the presence of tert-amyl-alcohol as a diluent comprising about 29 weight percent of the uncured reaction mixture.

What is claimed:

1. An ophthalmic lens formed from a reaction mixture comprising: a high molecular weight hydrophilic polymer; an effective amount of an hydroxyl-functionalized silicone-containing monomer; and an amount of polyethylene glycol effective to facilitate release of the lens from a mold part in which the device is formed, wherein the polyethylene glycol comprises one or more of: PEG 2000, mPEG and PEG DME.

2. The ophthalmic lens of claim 1 wherein the amount of said polyethylene glycol effective to facilitate release of the lens from a mold part in which the lens is formed comprises between 0.005 to 10 weight %.

3. The ophthalmic lens of claim 1 wherein the amount of said polyethylene glycol effective to facilitate release of the lens from a mold part in which the lens is formed comprises between 0.05 to 5 weight %.

4. The ophthalmic lens of claim 1 wherein the amount of said polyethylene glycol effective to facilitate release of the lens from a mold part in which the lens is formed comprises between 0.01 to 3 weight %.

5. The ophthalmic lens of claim 1 wherein the ophthalmic lens is a silicone hydrogel contact lens.

6. The ophthalmic lens of claim 1 wherein the polyethylene glycol comprises PEG 2000.

7. The ophthalmic lens of claim 2 wherein the polyethylene glycol comprises mPEG.

8. The ophthalmic lens of claim 2 wherein the polyethylene glycol comprises PEG DME.

* * * * *